United States Patent
Zaborowski (10) Patent No.: US 10,643,498 B1
(45) Date of Patent: May 5, 2020

(54) ARTHRITIS EXPERIENTIAL TRAINING TOOL AND METHOD

(71) Applicant: Realityworks, Inc., Eau Claire, WI (US)

(72) Inventor: Michael John Zaborowski, Eau Claire, WI (US)

(73) Assignee: Ralityworks, Inc., Eau Claire, WI (US)

( * ) Notice: Subject to any disclaimer, the term of this patent is extended or adjusted under 35 U.S.C. 154(b) by 196 days.

(21) Appl. No.: 15/825,732

(22) Filed: Nov. 29, 2017

Related U.S. Application Data (60) Provisional application No. 62/428,071, filed on Nov. 30, 2016.

(51) Int. Cl.
  *G09B 23/28* (2006.01)
  *G09B 23/32* (2006.01)
  *G09B 9/00* (2006.01)

(52) U.S. Cl.
  CPC .............. *G09B 23/32* (2013.01); *G09B 9/00* (2013.01)

(58) Field of Classification Search
  USPC ........ 434/247, 258, 262, 274; 63/15.5, 15.6; 482/44, 47, 48; 601/40
  See application file for complete search history.

(56) References Cited

U.S. PATENT DOCUMENTS

| | | | |
|---|---|---|---|
| 2,787,142 A * | 4/1957 | Axel | A44C 9/02 63/15.6 |
| 3,901,045 A * | 8/1975 | Ballester | A44C 9/02 63/15.65 |
| 4,531,919 A | 7/1985 | Ware | |
| 4,697,437 A * | 10/1987 | D'Annunzio | A44C 9/02 63/15.5 |
| 4,765,320 A * | 8/1988 | Lindemann | A61F 5/0118 602/22 |
| 4,830,360 A * | 5/1989 | Carr, Jr. | A63B 23/16 482/47 |
| 4,875,469 A * | 10/1989 | Brook | A61H 1/0288 601/40 |
| 4,949,711 A * | 8/1990 | Gyovai | A61F 5/0118 601/40 |
| 5,067,924 A | 11/1991 | Munter | |
| 5,167,561 A | 12/1992 | Rizzo | |
| 5,373,585 A * | 12/1994 | Wiggins | A41D 19/00 2/159 |
| 5,385,474 A | 1/1995 | Brindle | |
| 5,403,191 A | 4/1995 | Tuason | |
| 5,419,729 A | 5/1995 | Gross | |
| 5,513,992 A | 5/1996 | Refait | |
| 5,584,701 A | 12/1996 | Lampotang et al. | |

(Continued)

FOREIGN PATENT DOCUMENTS

GB 2400484 B 10/2004

*Primary Examiner* — Kurt Fernstrom
(74) *Attorney, Agent, or Firm* — Sherrill Law Offices, PLLC (57) ABSTRACT

An implement for simulating effects of arthritis on a human hand, and method of using the implement to experience the effects of arthritis on a human hand. The implement has a first component operable for secure attachment to a human's wrist, a second component operable for secure attachment to at least one of the human's fingers, and an elastic connection between the first and second components operable to resist articulation of at least one of the wrist and the at least one finger.

16 Claims, 7 Drawing Sheets

(56) References Cited

U.S. PATENT DOCUMENTS

| | | | |
|---|---|---|---|
| 5,597,312 A | 1/1997 | Bloom et al. | |
| 5,680,590 A | 10/1997 | Parti | |
| 5,682,469 A | 10/1997 | Linnett et al. | |
| 5,697,103 A * | 12/1997 | Wiggins | A41D 19/00 |
| | | | 2/159 |
| 5,791,907 A | 8/1998 | Ramshaw et al. | |
| 5,800,177 A | 9/1998 | Gillio | |
| 5,810,747 A | 9/1998 | Brudny et al. | |
| 5,853,292 A | 12/1998 | Eggert et al. | |
| 5,867,175 A | 2/1999 | Katzenberger et al. | |
| 5,871,018 A | 2/1999 | Delp et al. | |
| 5,880,731 A | 3/1999 | Liles et al. | |
| 5,884,029 A | 3/1999 | Brush, II et al. | |
| 5,913,708 A | 6/1999 | Gross | |
| 6,003,334 A * | 12/1999 | Miller | A44C 9/02 |
| | | | 63/15.5 |
| 6,074,213 A | 6/2000 | Hon | |
| 6,077,082 A | 6/2000 | Gibson et al. | |
| 6,160,986 A | 12/2000 | Gabai et al. | |
| 6,193,519 B1 | 2/2001 | Eggert et al. | |
| 6,246,975 B1 | 6/2001 | Rivonelli et al. | |
| 6,285,380 B1 | 9/2001 | Perlin et al. | |
| 6,296,487 B1 | 10/2001 | Lotecka | |
| 6,358,053 B1 | 3/2002 | Rosenfield et al. | |
| 6,391,057 B1 | 5/2002 | Schleipman et al. | |
| 6,507,353 B1 | 1/2003 | Huard et al. | |
| 6,561,811 B2 | 5/2003 | Rapoza et al. | |
| 6,672,105 B1 * | 1/2004 | Sills | A44C 9/02 |
| | | | 63/15.5 |
| 6,692,258 B1 | 2/2004 | Kurzweil et al. | |
| 6,705,869 B2 | 3/2004 | Schwartz | |
| 7,347,695 B2 | 3/2008 | Ware et al. | |
| 7,597,665 B2 | 10/2009 | Wilk et al. | |
| 7,735,337 B2 * | 6/2010 | Nanasi | A44C 9/02 |
| | | | 63/15.6 |
| 7,887,330 B2 | 2/2011 | King | |
| 7,940,937 B2 | 5/2011 | Smith | |
| 8,162,668 B2 | 4/2012 | Toly | |
| 8,388,347 B2 | 3/2013 | Beville | |
| 8,469,713 B2 | 6/2013 | Kron et al. | |
| 8,491,447 B1 * | 7/2013 | Koranic | A63B 21/0421 |
| | | | 482/44 |
| 8,544,113 B1 | 10/2013 | Boettcher et al. | |
| 8,670,018 B2 | 3/2014 | Cunnington et al. | |
| 8,918,162 B2 | 12/2014 | Prokoski | |
| 8,963,987 B2 | 2/2015 | Byun et al. | |
| 9,387,110 B2 * | 7/2016 | Kelly | A61F 5/0118 |
| 9,463,355 B2 * | 10/2016 | Davis | A63B 23/16 |
| 9,764,190 B2 * | 9/2017 | Hoffman | A63B 23/16 |
| 2006/0129067 A1 | 6/2006 | Grajales et al. | |
| 2007/0066455 A1 | 3/2007 | Leavitt | |
| 2010/0062407 A1 | 3/2010 | Lecat | |
| 2010/0311546 A1 * | 12/2010 | Kupferman | A63B 21/0004 |
| | | | 482/47 |
| 2012/0003614 A1 | 1/2012 | McBride | |
| 2012/0056982 A1 | 3/2012 | Katz et al. | |
| 2012/0270197 A1 | 10/2012 | Brost et al. | |
| 2013/0196302 A1 | 8/2013 | Lecat | |
| 2013/0207886 A1 | 8/2013 | Hall | |
| 2014/0087343 A1 | 3/2014 | Lecat | |
| 2014/0113263 A1 | 4/2014 | Jarrell et al. | |
| 2014/0278455 A1 | 9/2014 | Chandrasekaran et al. | |
| 2015/0052944 A1 * | 2/2015 | Affolter | A44C 9/0046 |
| | | | 63/15.65 |
| 2015/0366277 A1 * | 12/2015 | Rabbeth, Jr. | A41D 19/01588 |
| | | | 2/16 |

* cited by examiner

ARTHRITIS EXPERIENTIAL TRAINING TOOL AND METHOD

BACKGROUND

The invention is directed to simulating physical effects of arthritis as part of an educational program.

A number of geriatric simulators have been developed to provide a hands on experience of the physical effects commonly associated with aging. Some such suits include the GERT Aging Simulation Suit, the Sakamoto Physical Limitations Simulation Suit, and the Virtual Dementia Tour from Second Wind Dreams. These simulators all use some form of glove to simulate arthritic effects on the hands.

U.S. Pat. No. 8,388,347 (Beville), assigned to Second Wind Dreams, goes into greater detail, disclosing a system for allowing a user to experience simulated effects of an age related condition comprising eyewear, handwear, footwear, and an audio recording. Beville discloses handwear such as "gloves, mittens, or other coverings for wearing on the user's hands", designed to reduce the ability to feel or grasp and limit finger or hand movement. Beville further discloses use of protrusions which could be internal next to the skin or external between the glove and an object the user is interacting with, to introduce discomfort or pain while performing a task. Beville suggests that these protrusions could be changed to simulate different medical conditions.

There are many weaknesses in the system disclosed by Beville. Multiple sizes of gloves are required to fit varying hand sizes, and hand strength variations from person to person can result in very different experiences from one person to the next, such that one person may receive an overly harsh perception of an arthritic condition while another may walk away from the experience with a perception that an arthritic condition is but a modest nuisance. The nature of flexible fabric used in these gloves also means that the limiting factor upon the user's range of motion is imprecisely controlled.

Accordingly, a substantial need exists for an arthritic hand simulation implement that accommodates a range of student hand sizes and strengths, that provides a more controlled simulation of arthritic symptoms, and that enables the experience of multiple levels of impact during a simulation.

SUMMARY OF THE INVENTION

A first aspect of the invention is an implement for simulating effects of arthritis on a wearer's hands. A first embodiment of the first aspect of the invention is an implement that includes (i) a first component operable for secure attachment to the wearer's wrist, and (ii) a second component operable for secure attachment to at least one of the wearer's fingers, and (iii) an elastic connection between the first and second components operable to resist articulation of at least one of the wearer's wrist and the at least one of the wearer's fingers.

A right hand and left hand pair of the implements are preferably provided together as a complementary set.

A second embodiment of the first aspect of the invention is an implement that includes (i) an adjustable diameter loop defining a bore and operable for fitted engagement around a finger joint, and (ii) a pressure pad attached to the loop and operable for pressing against a dorsal facing portion of the finger joint when the implement is worn. In a preferred embodiment the pressure pad projects radially inward and the implement further comprises a means for adjusting the radial distance which the pressure pad projects into the bore.

A second aspect of the invention is a method for experiencing the effects of arthritis on a wearer's hands. A first embodiment of the second aspect of the invention includes the steps of (A) obtaining an implement in accordance with the first embodiment of the first aspect of the invention, (B) donning the implement by (-)securing the first component to a wrist, (-)securing the second component to at least one finger, and (-)elastically connecting the first and second components whereby resistance is provided to at least one of articulation of the wrist and the at least one finger, and (C) performing an activity that requires articulation of at least one of the wrist and the at least one finger.

A second embodiment of the second aspect of the invention includes the steps of (A) obtaining an implement in accordance with the second embodiment of the first aspect of the invention, (B) inserting a finger into the bore of the loop with the pressure pad located on the dorsal side of a joint, (C) increasing the distance which the pressure pad radially extends into the bore until the pressure pad exerts a first resistance against articulation of the finger at the joint, and (D) performing an activity requiring flexing of the finger.

DETAILED DESCRIPTION OF A PREFERRED EMBODIMENT

Nomenclature Table

| REFERENCE NO. | NAME |
| --- | --- |
| 1 | Center Frame |
| 2 | Wrist Frame |
| 3 | Distal Wrist Strap |
| 4 | Proximal Wrist Strap |
| 5 | Thumb Joint Clamp |
| 6 | Index Finger Joint Clamp |
| 7 | Middle Finger Joint Clamp |
| 8 | Ring Finger Joint Clamp |
| 9 | Pinky Finger Joint Clamp |
| 10 | Strap Slot |
| 11 | Strap Slot |
| 12 | Strap Slot |

| REFERENCE NO. | NAME |
| --- | --- |
| 13 | Strap Slot |
| 14 | Rear Washer |
| 15 | Rear Washer Rivet |
| 16 | Center Washers |
| 17 | Center Rivet |
| 18 | Elastic Band |
| 19 | Front Washers |
| 20 | Front Washers Rivet |
| 21 | Thumb Bracket Washer & Rivet |
| 22 | Thumb Bracket |
| 23 | Thumb Connecting Beam Proximal Rivet |
| 24 | Thumb Connecting Beam |
| 25 | Thumb Connecting Beam Distal Rivet |
| 26 | Thumb Beam |
| 27 | First Thumb Beam Locating Hole |
| 28 | Second Thumb Beam Locating Hole |
| 29 | Last Thumb Beam Locating Hole |
| 30 | Index Finger Beam |
| 31 | Ring Finger Beam |
| 32 | Pinky Finger Beam |
| 33 | First Index Beam Locating Hole |
| 34 | Last Index Beam Locating Hole |
| 35 | First Middle Finger Locating Hole |
| 36 | Last Middle Finger Locating Hole |
| 37 | First Ring Finger Beam Locating Hole |
| 38 | Last Ring Finger Beam Locating Hole |
| 39 | First Pinky Beam Locating Hole |
| 40 | Last Pinky Beam Locating Hole |
| 41 | Index Finger Rivet |
| 42 | Ring Finger Rivet |
| 43 | Pinky Finger Rivet |
| 44 | Clamp Screw |
| 45 | Finger Loop |
| 46 | Lower Pressure Pad |
| 47 | Upper Pressure Pad |
| 48 | Pressure Pad Ridge |
| 49 | Relaxed Finger |
| 50 | Finger Loop Pivot Point |
| 51 | Pressure Pad Rear Contact Point |
| 52 | Straight Finger Beam |
| 53 | Bent Finger Beam |
| 54 | Applied Torque |
| 55 | Bent Finger |

Construction

Figure 1:
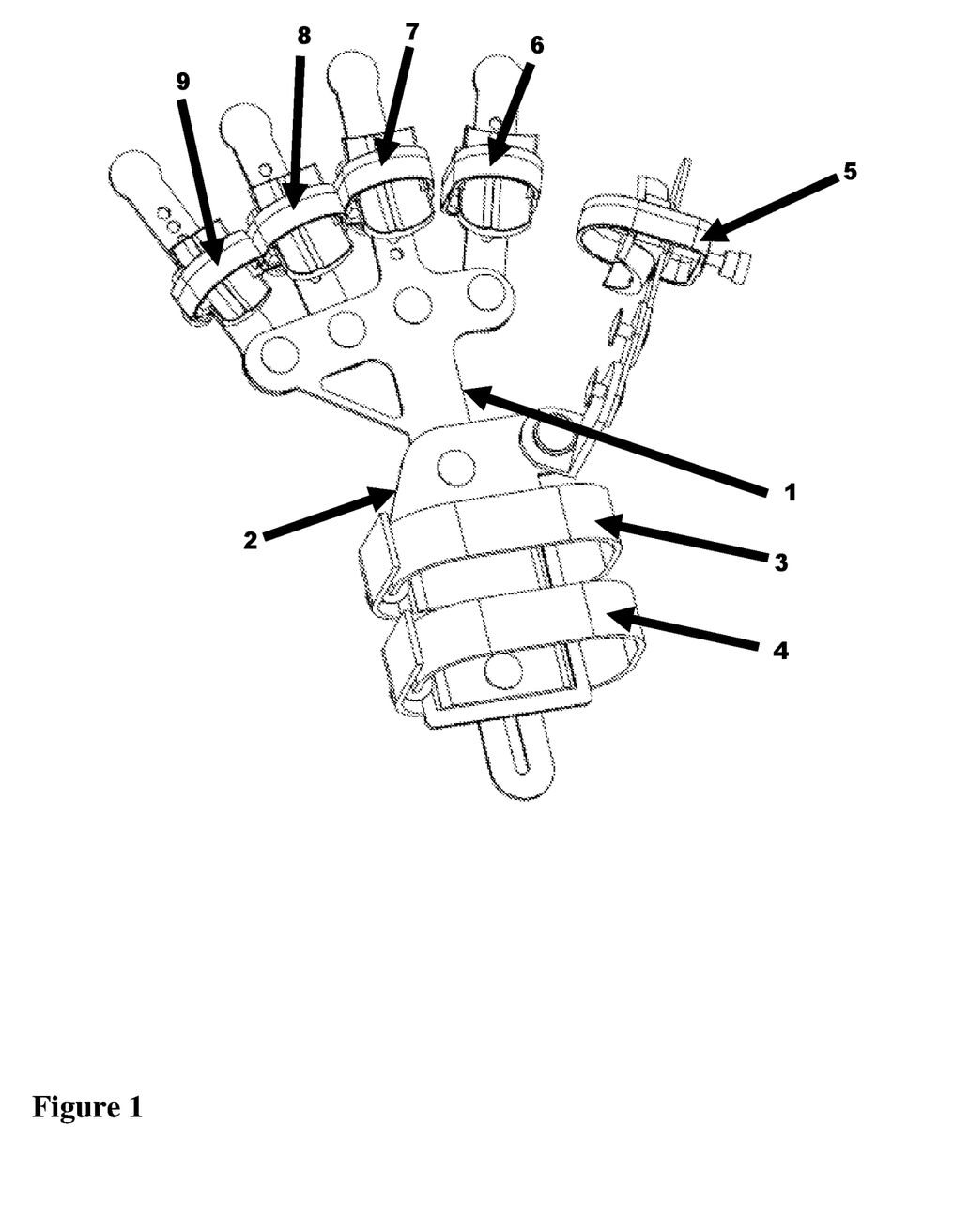
FIG. 1 is a perspective view of the interior facing side of one embodiment of a right handed version of an arthritis simulator in accordance with the invention.

Referring to FIG. 1, one embodiment of the arthritis simulator is comprised of a center frame 1 and a wrist frame 2. A distal wrist strap 3 and proximal wrist strap 4 thread through the wrist frame 2 and during use will wrap around the wearer's wrist to secure the wrist frame to the wrist and back of the wearer's hand. During use, the wearer's fingers are inserted into the corresponding clamps, such that their thumb is captured by the thumb joint clamp 5, their index finger is captured by the index finger joint clamp 6, their middle finger is captured by the middle finger joint clamp 7, their ring finger is captured by the ring finger joint clamp 8, and their pinky finger is captured by the pinky finger joint clamp 9. A leaf spring can be used to connect the wrist frame 2 to the thumb joint clamp 5 and separate leaf springs can be used to connect the center frame 1 to one, two, three or all four of the finger joint clamps 6, 7, 8 and 9.

Figure 2:
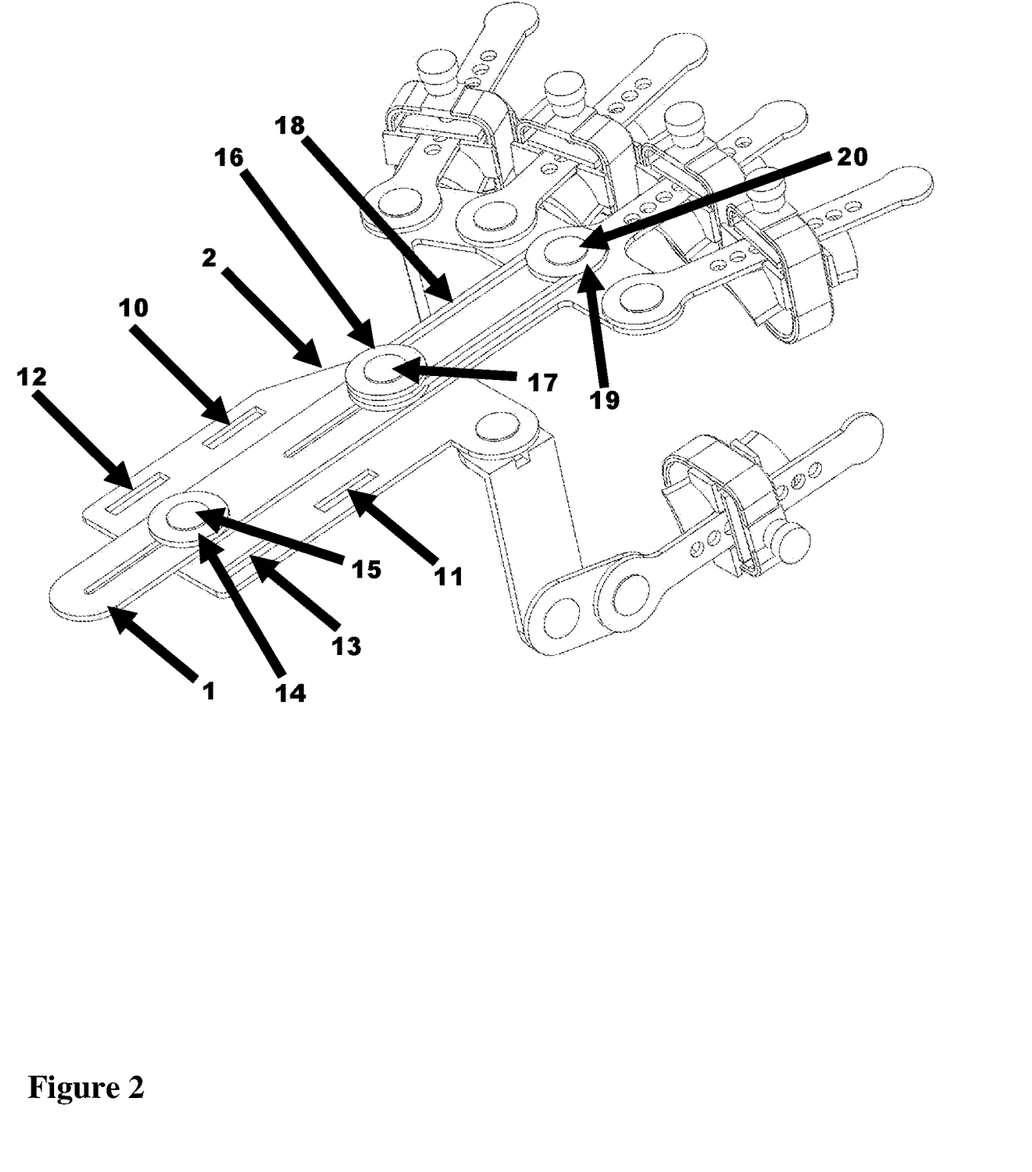
FIG. 2 is a perspective view of the exterior facing side of a left handed version of the invention depicted in FIG. 1.

Referring to FIG. 2, main structure of an embodiment of the arthritis simulator is comprised of the wrist frame 2 and the center frame 1. Both of these are preferably made from a bendable material, such as nylon, which allows them to conform to the curvature of the hand as well as bend as the fingers are flexed from a straight orientation down into a fist. The material is preferably rigid enough to maintain its shape, but bendable enough to allow the user to form a fist while noticing some resistance.

In a preferred embodiment, the wrist frame 2 contains strap slots 10 and 11 for attaching the distal wrist strap 3 and strap slots 12 and 13 for attaching the proximal wrist strap 4. The center frame 1 overlaps the wrist frame 2, extending from the proximal end all the way out to the fingers. A rear washer rivet 15 extends through a rear washer 14, a slot in the center frame 1, and a hole in the wrist frame 2. A center rivet 17 extends through two center washers 16, a slot in the center frame 1, and a hole in the wrist frame 2. These two attachment points allow the center frame to slide along the slots, relative to the fixed points on the wrist frame. The use of two center washers 16 creates a pulley feature to capture an elastic band 18 that extends from the center washers 16 to the front washers 19, which are fixedly attached to the center frame 1 by a front washers rivet 20. The front washers create a fixed point for one end of the elastic band 18, and the center washers 16 create a moving point (relative to the center frame) for the elastic band 18 to work on. The elastic band 18 creates resistance to the free flexing motion of the hand. The nature of this assembly makes it easy for a user to replace the elastic band 18 with another of similar length but potentially different elastic properties to create more or less resistance to the flexing motion of the hand.

Figure 3:
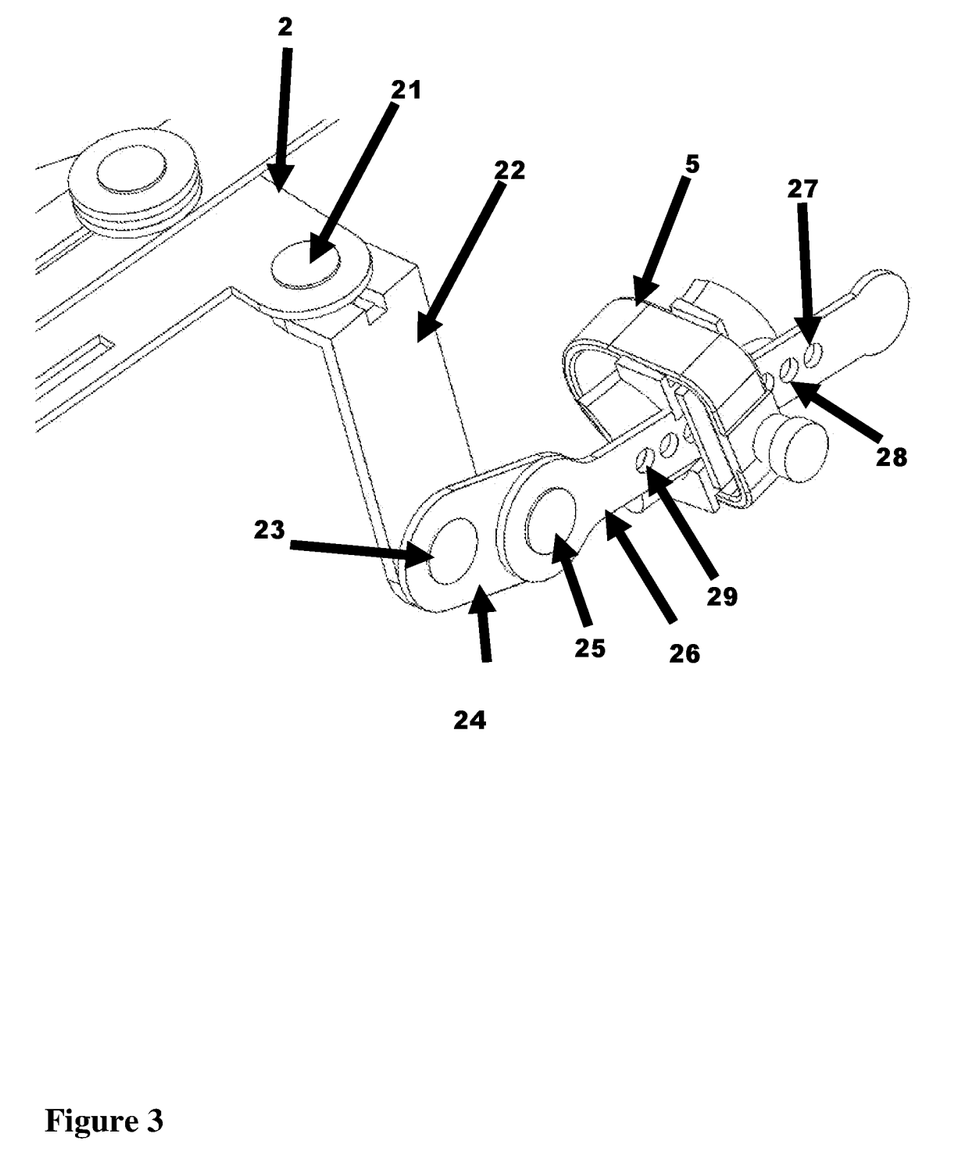
FIG. 3 is a perspective view of the thumb interacting portion of the arthritis simulator depicted in FIG. 2.

Referring to FIG. 3, in a preferred embodiment the thumb section of the arthritis simulator is shown in greater detail. A rigid thumb bracket 22 is attached to the bendable wrist frame 2 with a thumb bracket washer and river 21. This attachment allows the thumb bracket 22 to rotate with respect to the wrist frame 2 around the axis of the rivet, as well as bend the wrist frame 2 as needed to enable other, less common rotations of the thumb. A thumb connecting beam 24 is attached to the thumb bracket 22 with a thumb connecting beam proximal rivet 23. The thumb beam 26 is then connected to the thumb connecting beam 24 with a thumb connecting beam distal rivet 25. The thumb connecting beam 24 and thumb beam 26 are made of a bendable material, such as nylon. The bendable nature of these parts, as well as the joints formed by the rivets, enable the wearer to rotate and flex their thumb in a normal matter, with some noticeable resistance.

The thumb joint clamp 5 is attached to the thumb beam 26 using one of a series of locating holes. A first thumb locating hole 27 is located near the distal end of the thumb beam 26. A second thumb locating hole 28 is located a short distance proximal to the first—approximately 0.200 inches in the preferred embodiment. A series of these locating holes are found along the thumb beam, down to the last thumb locating hole 29 near the proximal end of the thumb beam. This series of locating holes allows the arthritis simulator to be adjusted to fit a range of hand sizes.

Figure 4:
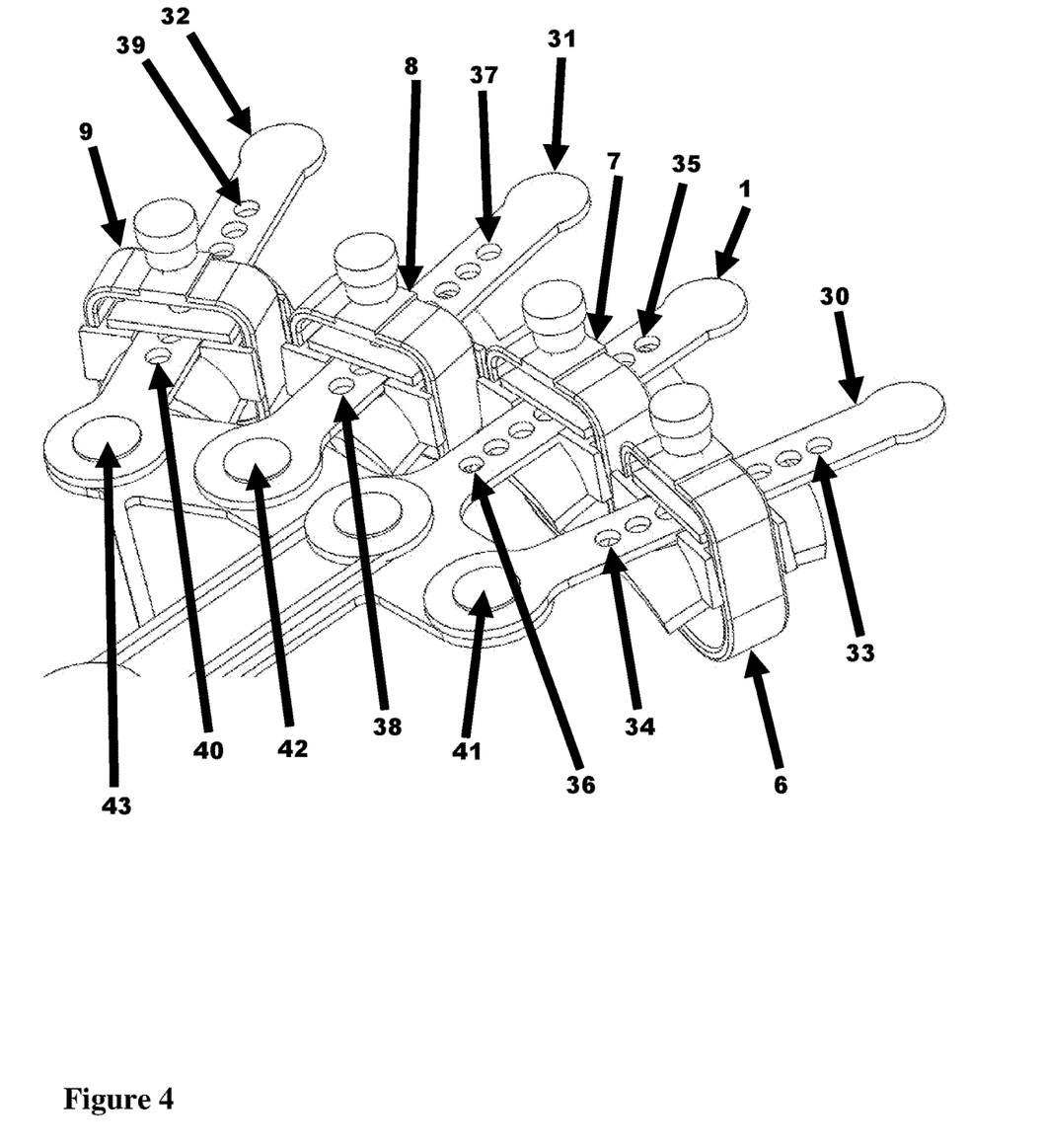
FIG. 4 is a perspective view of the finger interacting portion of the arthritis simulator depicted in FIG. 2.

Referring to FIG. 4, the center frame 1 and remaining fingers are shown. In a preferred embodiment the index finger beam 30 is attached to the center frame 1 by the index finger rivet 41. The index finger clamp 6 is connected to the index finger beam 30 through one of a series of locating holes ranging from a first index beam locating hole 33 to a last index beam locating hole 34. This series of locating holes allows the arthritis simulator to be adjusted to fit a range of hand sizes.

The middle finger clamp 7 is connected to the center frame 1 through one of a series of locating holes ranging from a first middle finger locating hole 35 to a last middle finger locating hole 36. This series of locating holes allows the arthritis simulator to be adjusted to fit a range of hand sizes.

The ring finger beam 31 is attached to the center frame 1 by the ring finger rivet 42. The ring finger clamp 8 is connected to the ring finger beam 31 through one of a series of locating holes ranging from a first ring finger beam locating hole 37 to a last ring finger beam locating hole 38. This series of locating holes allows the arthritis simulator to be adjusted to fit a range of hand sizes.

The pinky finger beam 32 is attached to the center frame 1 by the pinky finger rivet 43. The pinky finger clamp 9 is connected to the pinky finger beam 32 through one of a series of locating holes ranging from a first pinky beam locating hole 39 to a last index beam locating hole 40. This series of locating holes allows the arthritis simulator to be adjusted to fit a range of hand sizes.

The joints created by the index finger rivet 41, ring finger rivet 42, and pinky finger rivet 43 enable the user to spread their fingers naturally. The middle finger beam is intentionally integrated into the center frame 1 to maintain anatomical alignment of the simulator on the wearer's hand.

Figure 5:
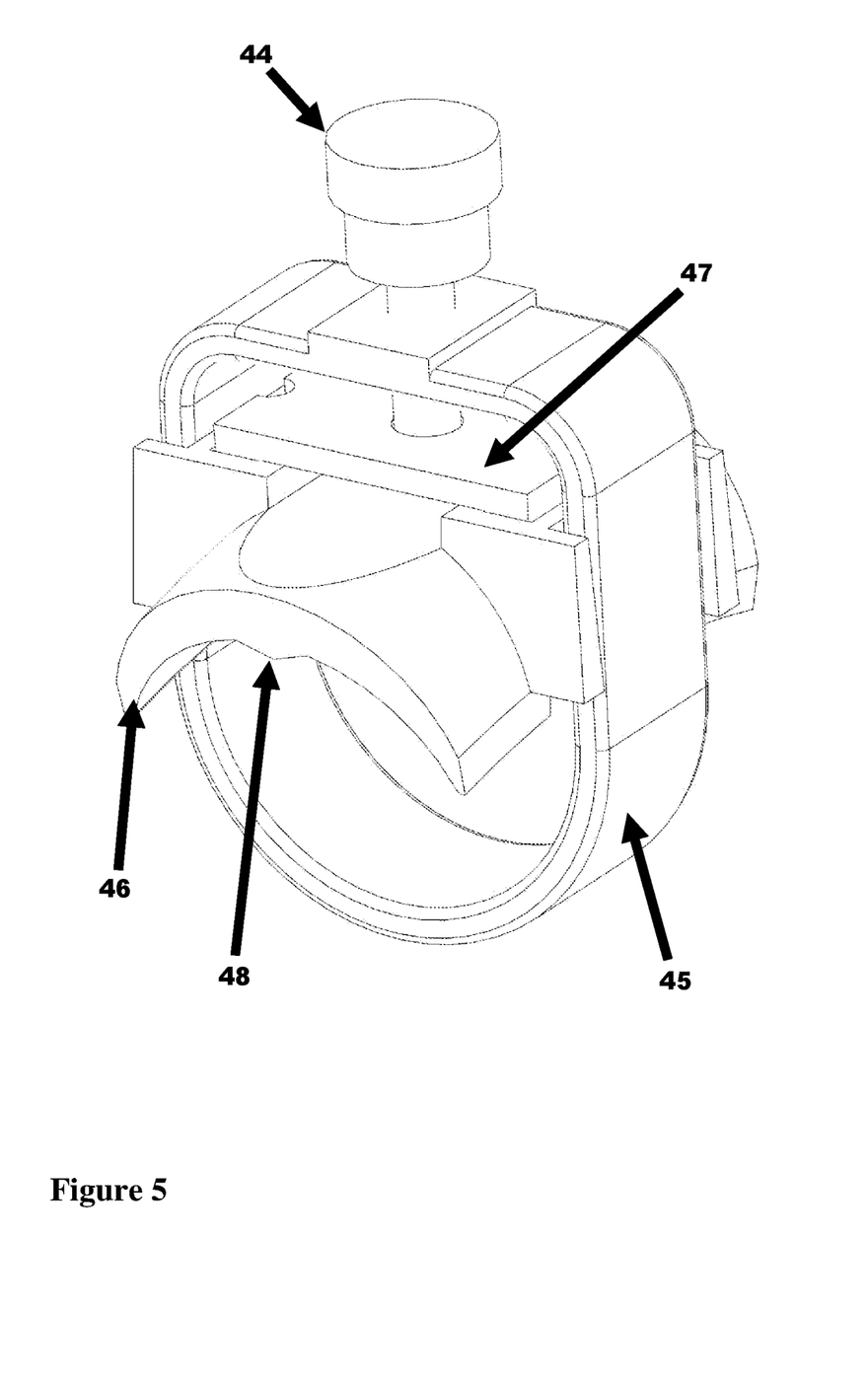
FIG. 5 is an enlarged perspective view of one of the finger joint clamp components of the arthritis simulator depicted in FIG. 2.

FIG. 5 shows a more detailed view of a preferred embodiment of a finger joint clamp, which is representative of a thumb joint clamp 5, index finger joint clamp 6, middle finger joint clamp 7, ring finger joint clamp 8, or pinky finger joint clamp 9. In one embodiment, all five of these finger joint clamps could be identical. In another embodiment, they could all be resized to accommodate natural variations in knuckle sizes. The primary features remain, regardless of how they are sized. The primary structure is a finger loop 45 that runs all around the finger joint. A lower pressure pad 46 is placed inside the finger loop 45. An upper pressure pad 47 would be attached to the lower pressure pad 46 during assembly, capturing the finger beam between them. A clamp screw 44 is then inserted through threads in the top side of the finger loop 45, through the upper pressure pad 47, through locating hole in the finger beam, and into the lower pressure pad 46. The clamp screw holds the finger joint clamp in position on the beam, as well as defines the maximum allowed distance between the lower pressure pad 46 and the bottom of the finger loop 45. In the preferred embodiment, a pressure pad ridge 48 may extend along the length of the lower pressure pad 46 to create more noticeable discomfort during use.

Figure 6:
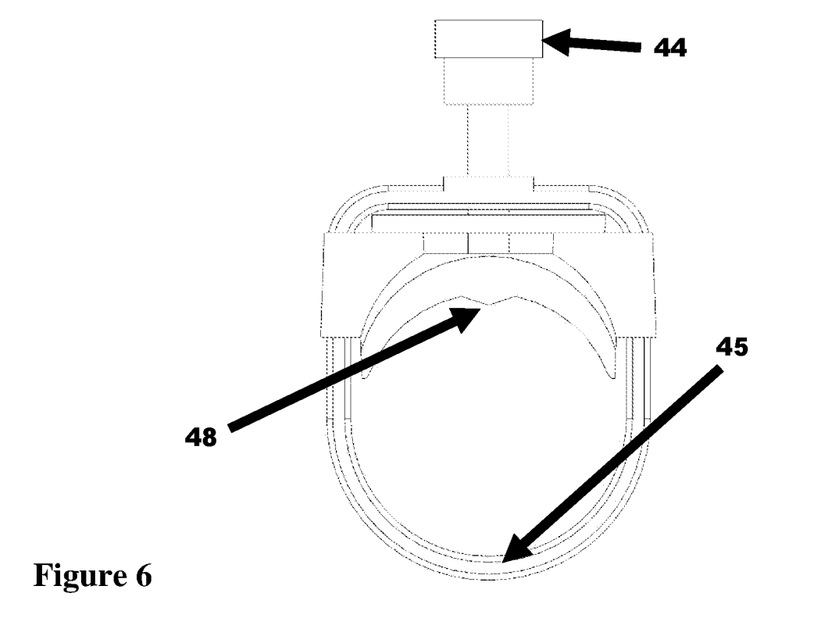
FIG. 6 is an enlarged end view of the finger joint clamp component depicted in FIG. 5 shown in an open state.

FIG. 6 shows a representative finger joint clamp in a fully open state. The clamp screw 44 is threaded through the top of the finger loop 45 and through the upper pressure pad 47, finger beam, and into the lower pressure pad 46. In this state, it is not pushing the pressure pad away from the top of the finger loop 45, creating the widest possible gap between the bottom of the finger loop 45 and the bottom of the pressure pad ridge 48.

Figure 7:
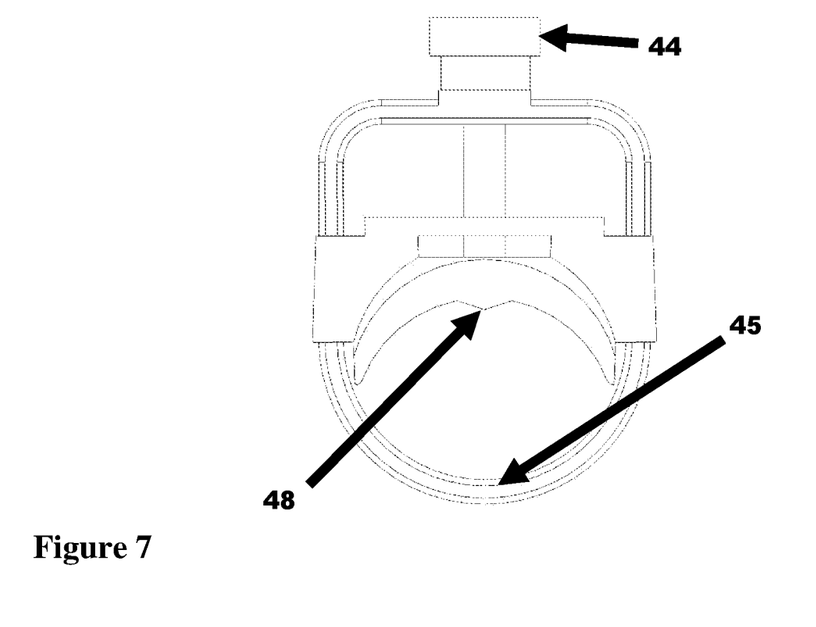
FIG. 7 is an enlarged end view of the finger joint clamp component depicted in FIG. 5 shown in a closed state.

FIG. 7 shows a representative finger joint clamp in a closed state. The clamp screw 44 is threaded through the top of the finger loop 45 and through the upper pressure pad 47, finger beam, and into the lower pressure pad 46. In this state, the clamp screw 44 is fully threaded through the top of the finger loop 45, so that it is pushing the pressure pad away from the top of the finger loop 45, creating the narrowest possible gap between the bottom of the finger loop 45 and the bottom of the pressure pad ridge 48.

Figure 8:
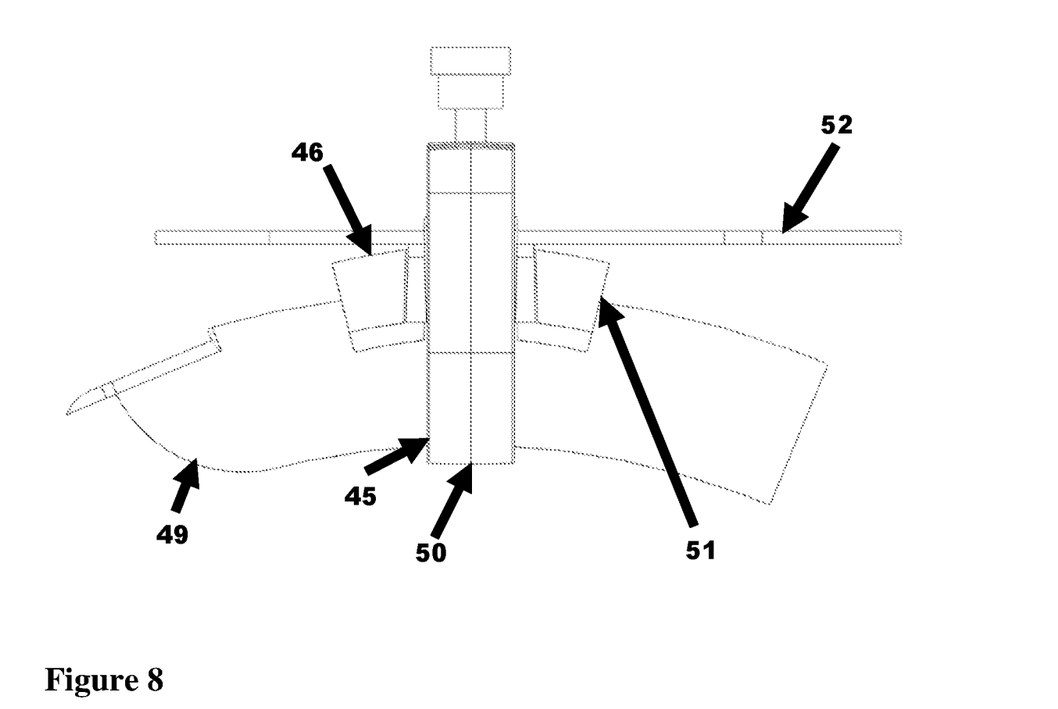
FIG. 8 is an enlarged side view of a finger joint clamp component depicted in FIG. 2 shown on a finger in a relaxed state.

Referring to FIG. 8, a relaxed finger 49 is shown placed inside of a finger joint clamp, with the finger loop 45 and lower pressure pad 46 enclosing a joint on the relaxed finger 49. The very bottom of the finger loop 45 is the finger loop pivot point 50, or the point around which the finger joint clamp will rotate when the finger is bent. The pressure pad rear contact point 51 is the point on the lower pressure pad 46 that will contact the finger as the finger bends. In the scenario shown in FIG. 8, the finger is in a relaxed state, resulting in a straight finger beam 52 that is not exerting any force or torque on the finger joint clamp.

Figure 9:
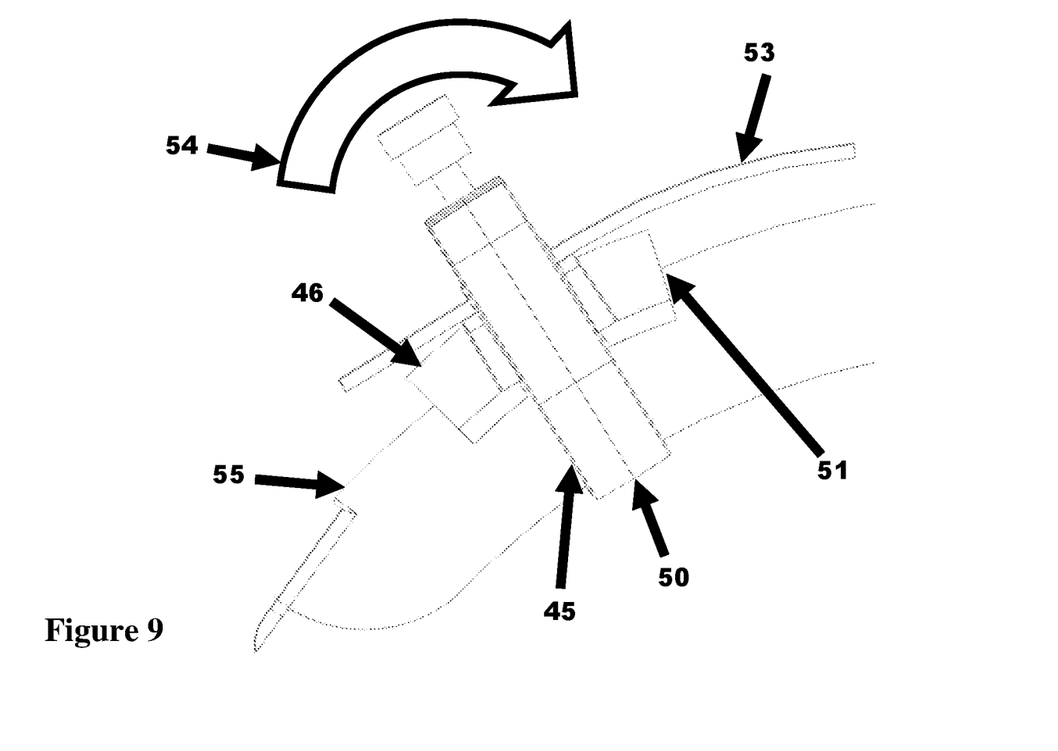
FIG. 9 is an enlarged side view of a finger joint clamp component depicted in FIG. 2 shown on a finger in a bent state.

Referring to FIG. 9, a bent finger 55 is shown inside of a finger joint clamp, with the finger loop 45 and lower pressure pad 46 enclosing a joint on the bent finger 55. The very bottom of the finger loop 45 is the finger loop pivot point 50, or the point around which the finger joint clamp rotates around the bent finger. The bent finger 55 causes the finger joint clamp to rotate clockwise as shown in the drawing, bending the bent finger beam 53. The bending of this finger beam creates an applied torque 54 on the rear of the finger joint clamp that forces the pressure pad rear contact point 51 into the bent finger 55, causing discomfort to the wearer. Due to the spring-like nature of bendable materials such as nylon in the preferred embodiment, as the bending distance increases as the finger bends, the restoring force increases and the pressure pad rear contact point 51 will exert more force on the wearer's finger.

Use

In the preferred embodiment, an instructor would attach a left handed version of the arthritis simulator to the left hand of a student, inserting their left fingers through the finger joint clamps, strapping the wrist frame to the student's left wrist, and then tightening the finger joint clamps to the point where they just begin to impede the student's flexing of their fingers. The instructor would similarly attach a right handed version of the arthritis simulator to the right hand of the student, inserting their right fingers through the finger joint clamps, strapping the wrist frame to the student's right wrist, and then tightening the finger joint clamps to the point where they just begin to impede the student's flexing of their fingers.

In the preferred embodiment, once the student has had the arthritis simulators installed on both of their hands, the instructor would direct them to perform an activity requiring flexible use of their hands and fingers, such as tying their shoes or picking up small objects.

In the preferred embodiment, once the student has experienced performing an activity with minimal restriction on their flexibility and mobility, the instructor would tighten the finger joint clamps and/or replace the elastic band with a tighter band. Then the instructor would direct the student to perform another activity requiring a similar amount of manual dexterity, allowing the student to experience the impact of restricted mobility and greater discomfort.

I claim:

1. An implement for simulating effects of arthritis on a wearer's hands, comprising:
   (a) a first component operable for secure attachment to the wearer's wrist,
   (b) a second component operable for secure attachment to at least one of the wearer's fingers, including at least (i) an adjustable diameter loop defining a bore and operably positioned on the implement for fitted engagement around a finger joint, and (ii) a pressure pad attached to the loop and operably positioned on the implement for pressing against a dorsal facing portion of the finger joint when the implement is worn so as to inflict simulated arthritic discomfort at the finger joint upon bending of the finger joint so as to inflict simulated arthritic discomfort at the finger joint upon bending of the finger joint, and
   (c) an elastic connection between the first and second components operable to resist articulation of at least one of the wearer's wrist and the at least one of the wearer's fingers.

2. The implement of claim 1 wherein the elastic connection is a leaf spring secured to the first component proximate a proximal longitudinal end of the leaf spring and secured to the second component proximate a distal longitudinal end of the leaf spring.

3. The implement of claim 1 wherein the elastic connection is an elastic band.

4. The implement of claim 1 wherein the elastic connection between the first and second components is operable to resist articulation of the wearer's wrist.

5. The implement of claim 1 wherein the elastic connection between the first and second components is operable to resist articulation of the at least one of the wearer's fingers.

6. The implement of claim 1 wherein the second component includes a plurality of elements each operable for secure attachment to one of the wearer's fingers, and the system includes a plurality of elastic connections between the first component and each element operable for resisting articulation of three of the wearer's fingers.

7. The implement of claim 6 wherein the elastic connection includes a plurality of leaf springs with each leaf spring secured to the first component proximate a proximal longitudinal end of the leaf spring and secured to a different one of the plurality of elements proximate a distal longitudinal end of each leaf spring.

8. The implement of claim 1 wherein the second component includes a plurality of elements each operable for secure attachment to one of the wearer's fingers, and the system includes a plurality of elastic connections between the first component and each element operable for resisting articulation of four of the wearer's fingers.

9. The implement of claim 1 wherein the second component includes a plurality of elements each operable for secure attachment to one of the wearer's fingers, and the system includes a plurality of elastic connections between the first component and each element operable for resisting articulation of five of the wearer's fingers.

10. A set comprising a complementary pair of implements according to claim 1 wherein one of the implements is configured and arranged for fitted engagement onto a right hand of the user and another of the implements is configured and arranged for fitted engagement onto a left hand of the user.

11. The implement of claim 1 wherein the elastic connection is a flexible component secured to the first and second components, positioned for traversing the back of a wearer's hand when the implement is worn.

12. An implement for simulating effects of arthritis on a wearer's finger, comprising:

(a) an adjustable diameter loop defining a bore and operably positioned on the implement for fitted engagement around a finger joint, and (b) a pressure pad attached to the loop and operably positioned on the implement for pressing against a dorsal facing portion of the finger joint so as to inflict simulated arthritic discomfort at the finger joint upon bending of the finger joint when the implement is worn.

13. The implement of claim 12 wherein the pressure pad projects radially inward and the implement further comprises a means for adjusting the distance which the pressure pad radially projects into the bore.

14. A method for experiencing the effects of arthritis on a human hand, comprising the steps of:

(a) securing a first component to a human wrist, (b) securing a second component to at least one of the human's fingers around a finger joint on the at least one finger wherein the second component includes a pressure pad pressing against a dorsal facing portion of a finger joint on the at least one of the human's fingers so as to inflict simulated arthritic discomfort at the finger joint upon articulation of the finger joint, (c) elastically connecting the first and second components whereby resistance is provided to at least one of articulation of the human's wrist and the at least one of the human's fingers, and (d) performing an activity that requires articulation of the finger joint so as to inflict simulated arthritic discomfort at the finger joint while performing the activity.

15. A method for experiencing the effects of arthritis on a human finger, comprising the steps of:

(a) obtaining an implement according to claim 12, (b) inserting a finger into the bore of the loop with the pressure pad located on the dorsal side of a joint, (c) increasing the distance which the pressure pad radially extends into the bore until the pressure pad exerts a first resistance against articulation of the finger at the joint, and (d) performing an activity requiring flexing of the finger with the pressure pad exerting the first resistance against articulation of the finger at the joint.

16. The method of claim 15 further comprising the steps of (e) further increasing the distance which the pressure pad radially extends into the bore until the pressure pad exerts a second greater resistance against articulation of the finger, and (f) performing an activity requiring flexing of the finger with the pressure pad exerting the second greater resistance against articulation of the finger at the joint.

* * * * *